UNITED STATES PATENT OFFICE.

MARCO CHIAPPONI, OF PARIS, FRANCE.

PROCESS OF MAKING ARTICLES FROM SLAG.

1,114,581.  Specification of Letters Patent.  Patented Oct. 20, 1914.

No Drawing.   Application filed November 6, 1913.   Serial No. 799,573.

*To all whom it may concern:*

Be it known that I, MARCO CHIAPPONI, a subject of the Kingdom of Italy, residing now at 49 Rue de Courcelles, Paris, France, have invented new and useful Improvements in Processes of Making Articles from Slag, of which the following is a specification.

My invention relates to a process for obtaining from furnace-slags a material similar to pottery or the like for various industrial applications. This material has the following advantages. It is impervious to moisture; it withstands the action of acid or alkali; it resists atmospheric actions being non-porous and almost as smooth as glass; it can be readily cleaned; it is a good insulator for electricity or heat; it can be heated suddenly to red heat without cracking or melting, which is not possible with glass; it is a refractory material; it has a fine luster without a defined color; it slightly resembles steel; it has an iridescent appearance with shadings of violet, blue and indigo; it can be molded into any artistic shape or pattern; it is so hard that steel will not scratch it; it is as equally resisting as porcelain, that is to say, when bedded on cement it will be sufficiently resisting for application for a large number of purposes. This material has not any definite chemical composition; but generally speaking it may be said to be a silicate with the basis of iron, manganese, lime, magnesia and a small proportion of other metals but it is not a material which responds to any definite formula. It can be better defined from a physical point of view. When a silicate, such as slag coming from the furnace, is poured into a mold and allowed to cool, it will pass through the following stages: Firstly, all is liquid; then the surface solidfies remaining always red and the inner mass remaining still liquid. Then the whole becomes solid and red; at this stage it is removed from the mold and the material will be found to have an extraordinary resistance. It can be hit sharply, or thrown on the ground without breaking. As soon, however, as it becomes solid, even by taking the greatest care to render the cooling as slow as possible, it will, nevertheless, break to pieces as soon as it passes from cherry red to black. However, by taking the same material while still red and suddenly throwing it into water or other liquid, the temperature of which is kept as low as possible, the material will cool rapidly and its molecules will arrange themselves in a state of equilibrium, and the cast will retain its form intact without cracking as would be the case with slow cooling. It will be sufficiently resisting for use commercially and particularly for hygienic constructions where it is particularly serviceable by reason of its qualities, its absolute impermeability and the fact that it can be washed. Although the material which is initially fused is known as cinders or slag, the same material fused and cooled in water as above described is not known commercially and may therefore be termed "cast-ceramic."

This material may be used for making domestic and commercial articles the same as ordinary ceramic, for example: tiles, facings, paving slabs, etc. Its applications are almost unlimited and one may say that inasmuch as cast iron has taken the place of wrought iron for a vast number of purposes, so also can this cast-ceramic be substituted for the existing ceramic uses in a number of cases particularly as the cost is about ten times cheaper.

The following is a method to be followed for the production of cast-ceramic: In some cases the initial material can be found at metal foundries ready to be put into the molds, that is when its composition is sufficiently basic so that when it is cooled in water it does not become breakable like glass. To strengthen the material or to color same, it is necessary to add from ten to twenty per cent. of mineral matter, iron oxid, manganese or other base of a cheap nature and same is then fused in a cupola furnace or a reverberatory furnace. Both furnaces might even be combined so that by running the fused material from the cupola into the reverberatory furnace a more intimate and homogeneous mixture can be obtained in this furnace in such a manner that the cast articles shall all be of the same composition. The fused material is run into a mold previously heated to cherry red, is then allowed to cool until the mass solidifies and approaches a cherry red heat. It is obvious that this would not be possible if the preliminary material had the composition of glass because at red heat the glass is still liquid. The material employed being entirely basic melts at about 1300° C., so that at cherry red heat it remains quite solid. As soon as these conditions of temperature are reached it is quickly taken from the crucible and thrown at once into water or other liquid which should so far as possible be kept at a temperature of about 2 or 3 degrees. The temperature will naturally tend to rise owing to the introduction of the hot material, but it is necessary to provide a flow of cold water or other means to keep the liquid cool. Numerous automatic means may be adopted, for example: an endless belt passing through the water so that when the cast is thrown in it remains a certain time and is carried automatically to the other end of the water tank when it will be sufficiently cold for a person to remove it; it being ready for the market.

Having now particularly described and ascertained the nature of my said invention, and in what manner the same is to be performed, I declare that what I claim is:

1. The process of obtaining from furnace slag, articles of the kind described, consisting in fusing the slag, molding the same into the desired shape, and when the molded article solidifies and reaches a red heat, suddenly and quickly cooling the same by plunging it into a cooling medium.

2. The process of obtaining from furnace slag, articles of the kind described, consisting in fusing the slag, molding the same into the desired shape, removing the article from the mold, and suddenly and quickly cooling the same by plunging it into a cooling medium.

3. The process of obtaining from furnace slag, articles of the kind described, consisting in fusing the slag, molding the same into the desired shape, removing the article from the mold when the same solidifies and reaches a red heat, and suddenly and quickly cooling the same by plunging it into a cooling medium.

4. The process of obtaining from furnace slag, articles of the kind described, consisting in fusing the slag, adding thereto basic mineral matter, molding the slag into the desired shape, and suddenly and quickly cooling the same by plunging it into a cooling medium.

5. The process of obtaining from furnace slag, articles of the kind described, consisting in fusing the slag, pouring the slag into a heated mold, and suddenly and quickly cooling the molded slag by plunging it into a cooling medium.

In witness whereof I have hereunto set my hand in presence of two witnesses.

MARCO CHIAPPONI.

Witnesses:
ALBIN FRIESS,
HANSON C. COXE.

Copies of this patent may be obtained for five cents each, by addressing the "Commissioner of Patents, Washington, D. C."